2,948,723

DERIVATIVES OF 3,5-MORPHOLINEDIONES

John B. Bicking, 138 Wayne Ave., Hatfield, Pa., Glenn S. Skinner, 74 Ainstel Ave., Newark, Del., and John R. Lovett, 111 Newman St., Metuchen, N. J.

No Drawing. Filed Jan. 2, 1958, Ser. No. 706,572

3 Claims. (Cl. 260—247.7)

This invention is concerned with derivatives of 3,5-morpholinedione and particularly with 2,2-disubstituted derivatives thereof. They may be represented by the structural formula:

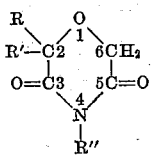

in which R may be hydrogen or a lower alkyl radical having from one to six carbon atoms and which may be straight or branch chained, and R' is phenyl. The radical R'' may be hydrogen or a lower alkyl radical, preferably methyl or ethyl.

The compounds of this invention are useful as chemotherapeutic agents, particularly as hypnotic and anticonvulsive agents. They are most conveniently administered by including them in conventional pharmaceutical capsules or in tablets with the usual tableting ingredients, but they may be taken internally as aqueous suspensions or as elixirs as well.

The compounds of the invention may be prepared from known chemicals, by procedural steps which may be represented by the following:

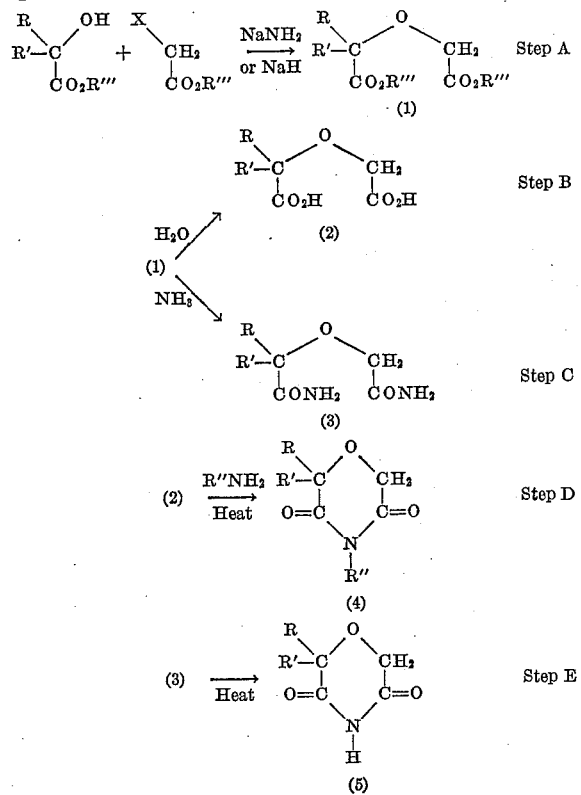

The radicals R and R' of the selected α-hydroxy acetate derivative are the same as stated above and are therefore selected to appear in the final desired compound. The radical R''' is preferably the residue of a lower aliphatic alcohol such as methanol or ethanol and its exact nature is immaterial inasmuch as it is removed in subsequent processing steps. The radical X represents a halogen which preferably is bromine or chlorine and R''' of this haloacetate is as defined above and preferably is the same alkyl radical although it may be different. The addition of this haloacetate results in the dialkyl α,α-disubstituted diglycolate, compound (1).

Compound (1) may then be hydrolyzed as shown by Step B to form the α,α-disubstituted diglycolic acid of compound (2), or compound (1) may be combined with ammonia as shown by Step C to form the α,α-disubstituted diglycolamide compound (3).

According to Step D the diglycolic acid compound (2) is heated with ammonia or a primary amine to effect a ring closure and obtain compound (4) which is a 2,2-disubstituted-3,5-morpholinedione of the invention. If ammonia is used R'' is hydrogen and if a primary amine is used, R'' is its alkyl radical.

According to Step E the diglycolamide compound (3) is heated to effect the necessary ring closure to obtain compound (5). Compound (5) corresponds to compound (4) when R'' is hydrogen. As stated above, compounds (4) and (5) are the 2,2-disubstituted 3,5-morpholinediones of the invention, although it will be observed that R may be hydrogen so that the compounds carry the single substitutent R'.

The invention will be clarified further by reference to the following examples:

EXAMPLE I

Production of diethyl α-phenyldiglycolate, compound (1), by Step A

Sodium amide (19.5 g., 0.5 mole) was suspended in 300 cc. ether in a 1 l. flask equipped with dropping funnel, condenser, and stirrer. Ethyl mandelate (45 g., 0.25 mole) was added dropwise, and the solution was refluxed one hour. Ethyl chloroacetate (61.2 g., 0.5 mole) was then added dropwise and the mixture refluxed two hours. Water was added, and the organic layer was washed with water, dried and distilled to give 21.3 g. product, B.P. 153–4°/2.5 mm. This compound was described by Godchot, Compt. rend., 177, 1226 (1923).

Production of α-phenyldiglycolamide, compound (3), by Step C

Diethyl α-phenyldiglycolate (22.6 g., 0.085 mole) was heated at 70° in a sealed bottle with a solution of 20 cc. liquid ammonia in 150 cc. ethanol. After 4 days, the solution was cooled and diluted with 150 cc. cyclohexane. The product which separated was recrystallized from isopropyl alcohol to give 11.8 g. of diamide, M.P. 157–158°. This compound was described by Godchot, Compt. rend., 177, 1226 (1923).

Production of 2-phenyl-3,5-morpholinedione, compound (5), by Step E

α-Phenyldiglycolamide (25.5 g., 0.124 mole) was placed in a distilling flask and heated at 200° for 40 minutes at a pressure of 20 mm. Hg. The imide which had been formed was distilled at oil pump vacuum. There was obtained 19.3 g. of an oil which crystallized in the receiver. Two recrystallizations from ethanol gave 14.5 g. of pure product, M.P. 124–125°.

Calcd. for $C_{10}H_9NO_3$: N, 7.33. Found: N, 7.33, 7.32.

EXAMPLE II

Methyl α-ethyl-α-phenyl-α-carbethoxymethoxyacetate

In a reaction carried out under a nitrogen atmosphere methyl ethylphenylhydroxyacetate (18.8 g., 0.097 mole) was added dropwise during 2 hours to a rapidly stirred suspension of sodium hydride (1.9 g., 0.08 mole) in 200 ml. of anhydrous benzene. A slow but continuous evolution of hydrogen was observed along with a gradual disappearance of the black granular sodium hydride. The reaction mixture was stirred at room temperature for 6.5 hours. At the end of this time nearly all of the sodium hydride had reacted and a white precipitate had formed in the reaction mixture. Refluxing for 1.5 hours produced a clear amber solution which was allowed to cool to room temperature. Ethyl bromoacetate (13.4 g., 0.08 mole) added dropwise to this rapidly stirred solution caused the precipitation of sodium bromide. After stirring overnight the reaction mixture was refluxed for 1 hour, cooled and any unreacted sodio salt decomposed by the addition of 100 ml. of cold water. Less than 0.002 mole of hydrogen ions was required to neutralize the solution produced. The benzene layer was separated and washed first with saturated sodium bicarbonate solution then with water. The wet benzene solution was swirled over anhydrous sodium sulfate. Removal of the benzene followed by distillation afforded 14.7 g. (65.6%) of the viscous clear liquid methyl α-ethyl-α- phenyl-α-carbethoxymethoxyacetate, B.P. 133–140° C. (0.6 mm.). Redistillation gave a sample suitable for analysis, B.P. 135–135.5° C. (0.7 mm.), $n_D^{25}$ 1.4945.

α-Ethyl-α-phenyldiglycolamide

Methyl α - ethyl-α-phenyl-α-carbethoxymethoxyacetate (4.2 g., 0.015 mole) dissolved in 100 ml. of anhydrous methanol contained in a pressure bottle was saturated at −5° C. with dry ammonia gas. The bottle was capped and allowed to stand for 7 days at 45–55° C. At the end of this time, removal of the solvent afforded a quantitative yield of crude diamide, M.P. 169–173° C. Recrystallizations of a small portion from methanol-ether mixtures gave a sample of α-ethyl-α-phenyldiglycolamide suitable for analysis, M.P. 175° C. (dec.).

2-ethyl-2-phenyl-3,5-morpholinedione

α-Ethyl-α-phenyldiglycolamide (1.0 g., 0.0042 mole) was pyrolyzed at 210–220° C. for 15 minutes. Cooling gave an amber oil which was taken up in hot methanol. Bone-blacking removed most of the color. Hot water was added to the point of incipient precipitation. Cooling gave 0.7 g. of the crude imide, M.P. 115–125° C. A single recrystallization from a methanol-water mixture gave 0.67 g. (73%) pure 2-ethyl-2-phenyl-3,5-morpholinedione, M.P. 124–125° C.

*Analysis.*—Calculated for $C_{12}H_{13}O_3N$: nitrogen, 6.39; carbon, 65.75; hydrogen, 5.97. Found: nitrogen, 6.41; carbon 65.87; hydrogen 5.97.

It will be apparent from the above examples that by the selection of the appropriate substituents on the α-carbon of the starting α-hydroxyacetate, it will be possible to readily obtain other compounds of the invention such as 2-methyl-2-phenyl-3,5-morpholinedione.

What is claimed is:
1. Compounds having the structure:

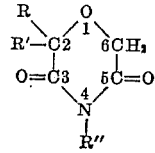

in which R is selected from the group consisting of hydrogen and straight and branched chain lower alkyl radicals having from 1 to 6 carbon atoms, R' is phenyl and R" is selected from the group consisting of hydrogen, methyl and ethyl.

2. 2-ethyl-2-phenyl-3,5-morpholinedione.
3. 2-phenyl-3,5-morpholinedione.

References Cited in the file of this patent
UNITED STATES PATENTS 2,835,669    Thoma _____ May 20, 1958

OTHER REFERENCES

Jungfleisch: Compt. Rend., vol. 145, pp. 70–73 (1907).